United States Patent
Saito et al.

(10) Patent No.: US 9,935,568 B2
(45) Date of Patent: Apr. 3, 2018

(54) CONTROL APPARATUS OF ROTARY ELECTRIC MACHINE

(71) Applicant: Mitsubishi Electric Corporation, Tokyo (JP)

(72) Inventors: Hiroyuki Saito, Tokyo (JP); Hideaki Tani, Tokyo (JP); Yasufumi Ogawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/431,914

(22) Filed: Feb. 14, 2017

(65) Prior Publication Data

US 2017/0302201 A1 Oct. 19, 2017

(30) Foreign Application Priority Data

Apr. 19, 2016 (JP) .................................. 2016-083333

(51) Int. Cl.
*H02P 6/10* (2006.01)
*H02P 6/17* (2016.01)
*H02P 27/08* (2006.01)

(52) U.S. Cl.
CPC .................. *H02P 6/10* (2013.01); *H02P 6/17* (2016.02); *H02P 27/08* (2013.01)

(58) Field of Classification Search
USPC .......................................... 318/139, 430–434
See application file for complete search history.

(56) References Cited

U.S. PATENT DOCUMENTS 5,469,215 A  11/1995  Nashiki
5,962,999 A * 10/1999  Nakamura ................ H02P 6/10
                                                   318/400.31

(Continued)

FOREIGN PATENT DOCUMENTS

JP        7-046878 A    2/1995
JP      2014-117019 A   6/2014

(Continued)

OTHER PUBLICATIONS

Communication dated Feb. 14, 2017 issued by the Japanese Patent Office in corresponding JP application No. 2016-083333.

*Primary Examiner* — Bentsu Ro
(74) *Attorney, Agent, or Firm* — Sughrue Mion, PLLC; Richard C. Turner

(57) ABSTRACT

A control apparatus of a rotary electric machine which can be configured so that the upper limit of a vibration torque component, in which the rotary electric machine is made to output, is not limited by a maximum output torque of the rotary electric machine is provided. The rotary electric machine is controlled such that when a vibration maximum value in which an amplitude of a vibration torque command value Tcv from a vibration command calculation section is added to a basic torque command value Tcb from a basic torque command calculation section exceeds an upper limit command value Tcmx, the addition of the vibration torque command value Tcv from the vibration command calculation section is stopped and a basic vibration torque command value Tcvb calculated by a basic vibration torque calculation block is regarded as a final torque command value Tcf.

6 Claims, 5 Drawing Sheets

(56) References Cited

U.S. PATENT DOCUMENTS

| | | | | |
|---|---|---|---|---|
| 7,317,978 B2* | 1/2008 | Ashizawa | ................ | B60K 6/48 |
| | | | | 701/51 |
| 7,504,784 B2* | 3/2009 | Asada | ................... | D06F 37/304 |
| | | | | 318/400.02 |
| 9,441,549 B2* | 9/2016 | Onozato | ............. | F02D 13/0219 |
| 2016/0226409 A1 | 8/2016 | Ogawa | | |

FOREIGN PATENT DOCUMENTS

| | | |
|---|---|---|
| JP | 2014-200129 A | 10/2014 |
| WO | 2015/059784 A1 | 4/2015 |

* cited by examiner

CONTROL APPARATUS OF ROTARY ELECTRIC MACHINE

BACKGROUND OF THE INVENTION

1. Field of the Invention

The present invention relates to a control apparatus of a rotary electric machine, which is made to superimpose a torque vibration component on an output torque of the rotary electric machine.

2. Description of the Related Art

In recent years, a hybrid car and an electric car have received much attention as environmentally friendly cars. The hybrid car is a car in which a rotary electric machine serves as a power source in addition to a conventional internal combustion engine. More specifically, both the internal combustion engine and the rotary electric machine serve as a driving force source of wheels. The electric car is a car in which the rotary electric machine serves as the driving force source. However, there is a case in which a torque vibration component such as a torque ripple is superimposed on the rotary electric machine and the vibration component is transmitted to the wheels. A sense of discomfort due to vibration is likely to be given to a driver during a vehicular start, deceleration, extremely low speed running, and the like. In a technique disclosed in the following Patent Document 1, it is configured such that the rotary electric machine is made to output a vibration torque that is for cancelling the torque vibration component.

Patent Document 1: JPH7(1995)-046878A

However, torque in which the rotary electric machine is made to be able to output is limited by magnetic saturation or the like and a maximum output torque of the rotary electric machine is defined. Accordingly, when the rotary electric machine is made to output the vibration torque in a state where an output torque of the rotary electric machine increases to the vicinity of the maximum output torque, there is a case in which the upper limit of a ridge portion of a vibration torque component is limited by the maximum output torque and the rotary electric machine is not made to be able to output. On the other hand, since the upper limit of a valley portion of the vibration torque component is not limited by the maximum output torque, the rotary electric machine is made to be able to output as it is. Accordingly, an average value of the output torque of the rotary electric machine is decreased by the ridge portion of the vibration torque component in which the upper limit thereof is limited. Thus, a problem exists in that the output torque is decreased when the output torque of the rotary electric machine is made to increase to the vicinity of the maximum output torque and the vehicle is made to accelerate.

SUMMARY OF THE INVENTION

The present invention has been made to solve the foregoing problem and is to obtain a control apparatus of a rotary electric machine in which the upper limit of a vibration torque component, in which a rotary electric machine is made to output, cannot be limited by a maximum output torque of the rotary electric machine.

According to the present invention, there is provided a control apparatus of a rotary electric machine, including: a basic torque command calculation section which calculates a basic torque command value that is a basic command value of torque in which the rotary electric machine is made to output; a vibration command calculation section which calculates a vibration torque command value that is a torque command value, the vibration torque command value being vibrated at a vibration frequency; and a final torque command calculation section which calculates an addition torque command value in which the vibration torque command value is added to the basic torque command value, and calculates a value in which the upper limit of the addition torque command value is limited by an upper limit command value that is preset correspondingly to a maximum output torque of the rotary electric machine, as a final torque command value to be commanded to the rotary electric machine. In the control apparatus, the vibration command calculation section has a determination block of presence/absence of amplitude addition (hereinafter, referred to as "amplitude addition presence/absence determination block") in which when a vibration maximum value in which an amplitude of the vibration torque command value is added to the basic torque command value becomes larger than the upper limit command value, the addition of the vibration torque command value is stopped so that the vibration maximum value does not exceed the upper limit command value.

According to the control apparatus of the rotary electric machine according to the present invention, since the amplitude of the vibration torque command value to be superimposed on the final torque command value is decreased, the upper limit is not limited by the upper limit command value set correspondingly to the maximum output torque of the rotary electric machine, whereby an average value of the final torque command value and an average value of an output torque of the rotary electric machine can be prevented from lowering than the basic torque command value.

The foregoing and other object, features, aspects, and advantages of the present invention will become more apparent from the following detailed description of the present invention when taken in conjunction with the accompanying drawings.

DETAILED DESCRIPTION OF THE INVENTION

Figure 1:
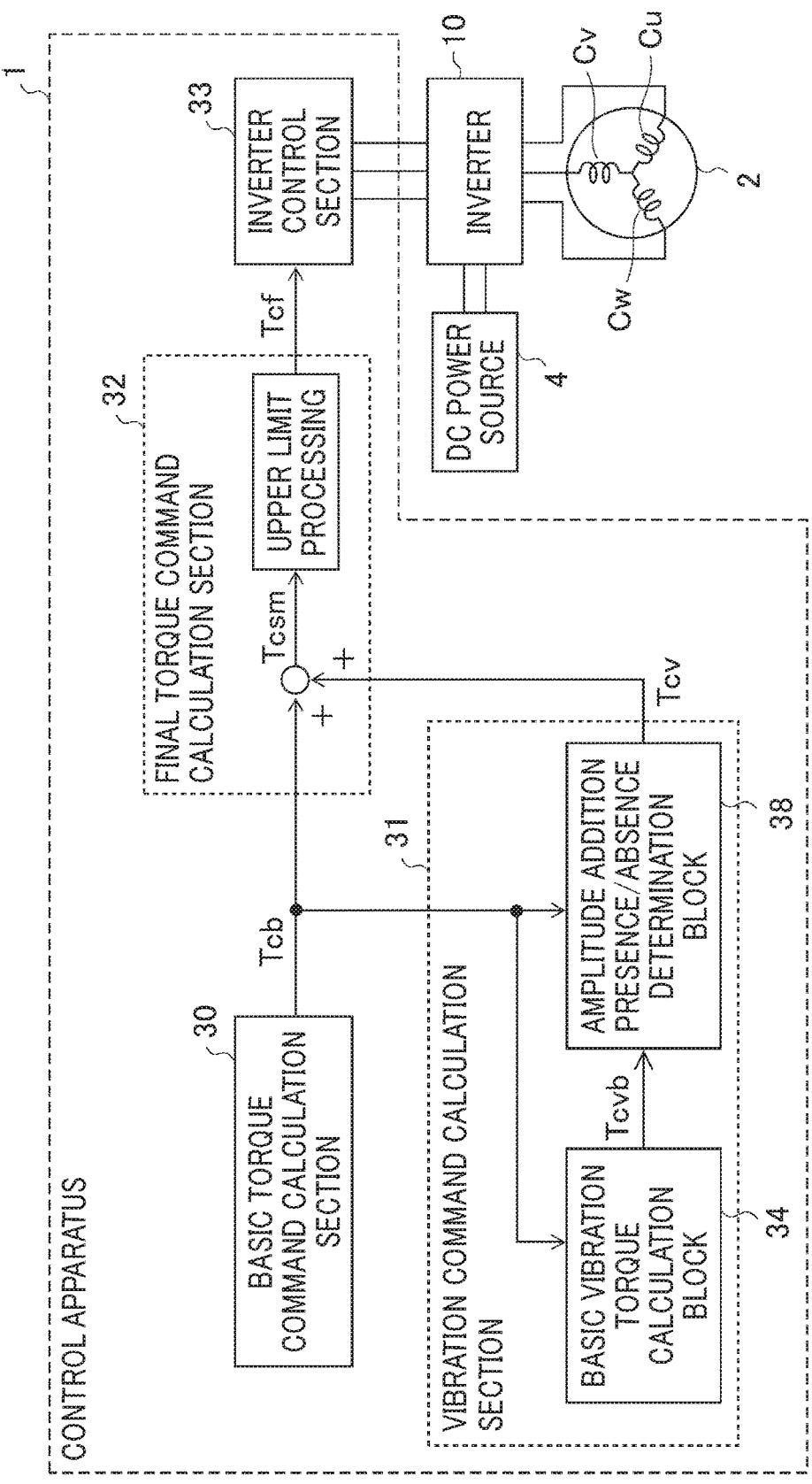
FIG. 1 is a block diagram showing the configuration of a control apparatus of a rotary electric machine according to Embodiment 1 of the present invention.

Next, embodiments for carrying out the present invention will be described with reference to drawings. Incidentally, the same reference numerals as those shown in the respective drawings represent identical or corresponding elements.

Embodiment 1

A control apparatus of a rotary electric machine (hereinafter, merely referred to as a "control apparatus") according to Embodiment 1 will be described with reference to the drawings. FIG. 1 is a schematic block diagram of a control apparatus 1 according to the present embodiment.

A rotary electric machine 2 includes: a stator fixed to a non-rotational member; and a rotor which is arranged on the radially inner side of the stator, and is rotatably supported to the non-rotational member. In the present embodiment, the rotary electric machine 2 is a permanent magnet type synchronous rotary electric machine; three phase windings Cu, Cv, Cw are wound around the stator; and permanent magnets are provided in the rotor. The rotary electric machine 2 is electrically connected to a direct current (DC) power source 4 via an inverter 10 that performs DC/alternating current (AC) conversion. The rotary electric machine 2 has at least the function of an electric motor which receives electric power supply from the DC power source 4 and generates power. Incidentally, the rotary electric machine 2 may have the function of a generator in addition to the function of the electric motor.

The inverter 10 is a DC/AC conversion device that performs electric power conversion between the DC power source 4 and the rotary electric machine 2. The inverter 10 is configured into a bridge circuit in which three sets of two switching elements, which are connected in series between a positive pole wire connected to a positive pole of the DC power source 4 and a negative pole wire connected to a negative pole of the DC power source 4, are provided correspondingly to the windings of each phase of three phases (U phase, V phase, W phase). A connection node connected in series to the positive pole side switching element and the negative pole side switching element is connected to the winding of the corresponding phase. An insulated gate bipolar transistor (IGBT) in which free wheel diodes are connected in reversely parallel, a metal oxide semiconductor field effect transistor (MOSFET), and the like are used for the switching element. The inverter 10 is equipped with current sensors 11 (see FIG. 3) each of which is for detecting a current that flows through each phase winding. The current sensor 11 is equipped on each phase wire that connects the series circuit of the switching elements and the winding.

Figure 2:
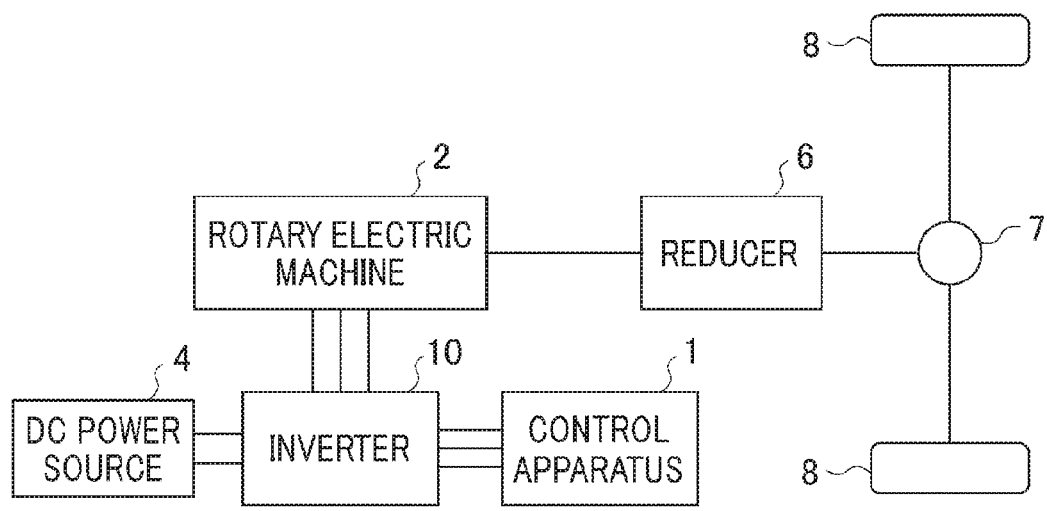
FIG. 2 is a diagram showing the schematic configuration of a vehicle equipped with the control apparatus of the rotary electric machine according to Embodiment 1 of the present invention.

In the present embodiment, as shown in FIG. 2, the rotary electric machine 2 serves as a driving force source of a vehicle; and a rotating shaft of the rotor of the rotary electric machine 2 is coupled to right and left two wheels 8 via a reducer 6 and a differential gear 7.

Figure 3:
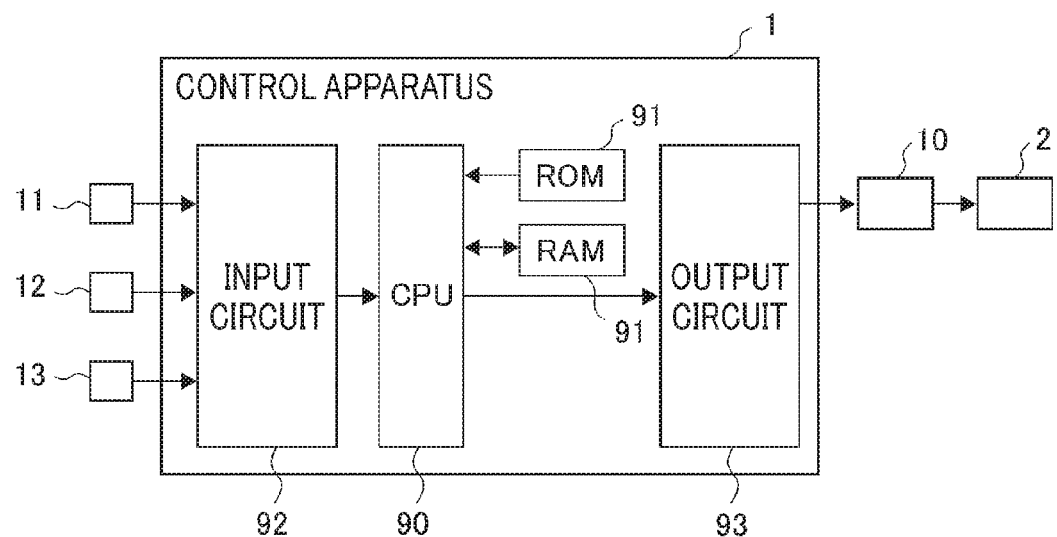
FIG. 3 is a block diagram showing the hardware configuration of the control apparatus of the rotary electric machine according to Embodiment 1 of the present invention.

The control apparatus 1 is a control apparatus that controls the rotary electric machine 2 by controlling the inverter 10. As shown in FIG. 1, the control apparatus 1 includes functional sections such as a basic torque command calculation section 30, a vibration command calculation section 31, a final torque command calculation section 32, and an inverter control section 33. The respective sections 30 to 33 and the like included in the control apparatus 1 are actualized by a processing circuit equipped by the control apparatus 1. Specifically, as shown in FIG. 3, the control apparatus 1 includes: a calculation processor 90 (computer), such as a central processing unit (CPU) and a digital signal processor (DSP); a storage device 91 that exchanges data to and from the calculation processor 90; an input circuit 92 that inputs an external signal to the calculation processor 90; an output circuit 93 that outputs a signal to the outside from the calculation processor 90; and the like, as the processing circuit. A random access memory (RAM) configured to be capable of reading and writing data from the calculation processor 90, a read only memory (ROM) configured to be capable of reading data from the calculation processor 90, and the like are equipped as the storage device 91. The input circuit 92 is connected to various types of sensors and switches and is equipped with an analog/digital (A/D) converter or the like which inputs output signals of these sensors and switches to the calculation processor 90. The output circuit 93 is connected to electrical loads such as switching elements and is equipped with a driving circuit or the like which outputs control signals from the calculation processor 90 to these electrical loads. In the present embodiment, the input circuit 92 is connected to the current sensor 11, a rotational speed sensor 12, a temperature sensor 13, and the like. The output circuit 93 is connected to the inverter 10 (switching elements or a gate driving circuit of the switching elements).

Then, the calculation processor 90 executes software (program) stored in the storage device 91 such as the ROM and cooperates with other hardware of the control apparatus 1 such as the storage devices 91, the input circuit 92, the output circuit 93, and the like, thereby actualizing each function of the respective sections 30 to 33 and the like, included in the control apparatus 1. Incidentally, set data, such as determination values and tables, which are used by the respective sections 30 to 33, are stored in the storage device 91 such as the ROM, as a part of the software (program). Hereinafter, the respective functions of the control apparatus 1 will be described in detail.

Figure 4:
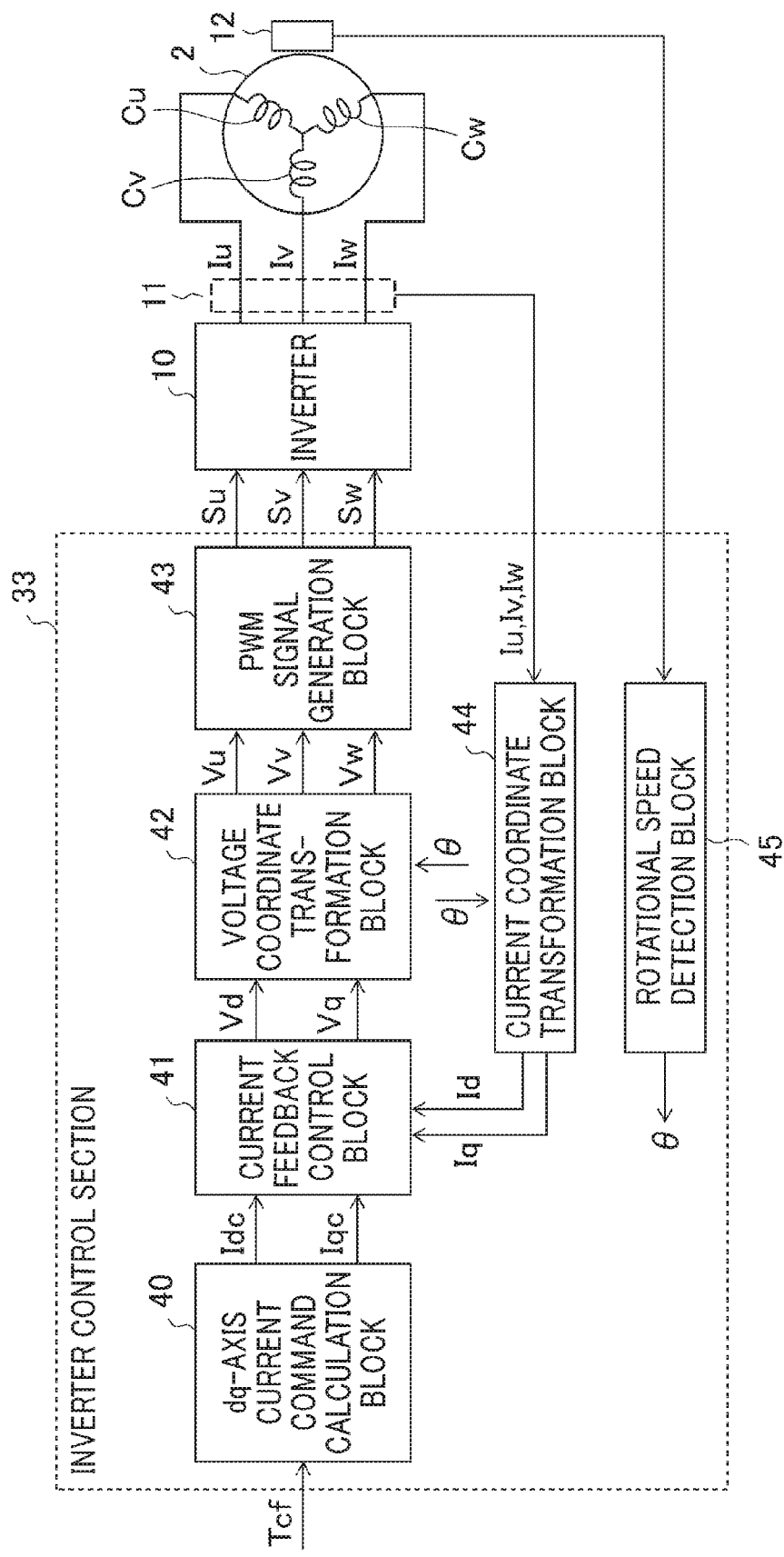
FIG. 4 is a block diagram showing an inverter control section in the control apparatus of the rotary electric machine according to Embodiment 1 of the present invention.

As shown in a block diagram of FIG. 4, the inverter control section 33 performs on/off control of the switching elements of the inverter 10 so that the rotary electric machine 2 outputs a torque of a final torque command value Tcf, which is transmitted from the final torque command calculation section 32 (to be described later). In the present embodiment, the inverter control section 33 is configured so as to perform current feedback control that uses a vector control method. The inverter control section 33 includes: a dq-axis current command calculation block 40; a current feedback control block 41; a voltage coordinate transformation block 42; a pulse width modulation (PWM) signal generation block 43; a current coordinate transformation block 44; and a rotational speed detection block 45.

The rotational speed detection block 45 detects a rotational speed of the rotary electric machine 2. The rotational speed detection block 45 detects an electrical angle $\theta$ (magnetic pole position $\theta$) and an electrical angular velocity of the rotor on the basis of an output signal of the rotational speed sensor 12 provided on the rotating shaft of the rotor.

The final torque command value Tcf calculated by the final torque command calculation section 32 is inputted to the dq-axis current command calculation block 40. The dq-axis current command calculation block 40 calculates a d-axis current command value Idc and a q-axis current command value Iqc, in which currents that flow through the three phase windings Cu, Cv, Cw are expressed in a dq-axis rotation coordinate system in order to make the rotary electric machine 2 output the torque of the final torque command value Tcf. Incidentally, the d-axis current command value Idc and the q-axis current command value Iqc are collectively referred to as "dq-axis current command values Idc, Iqc." The dq-axis current command calculation block 40 calculates the dq-axis current command values Idc, Iqc according to a current vector control method, such as maximum torque current control, magnetic flux weakening control, Id=0 control, and maximum torque magnetic flux control. The maximum torque current control calculates the dq-axis current command values Idc, Iqc in which a generated torque becomes maximum with respect to the same current. The magnetic flux weakening control moves the dq-axis current command values Idc, Iqc on an ellipse of a constant induced voltage according to the final torque command value Tcf. The Id=0 control sets the d-axis current command value Idc to 0 and changes the q-axis current command value Iqc according to the final torque command value Tcf or the like. The maximum torque magnetic flux control calculates the dq-axis current command values Idc, Iqc in which interlinkage magnetic flux becomes minimum in the occurrence of the same torque. In the present embodiment, the dq-axis current command calculation block 40 is configured to calculate the dq-axis current command values Idc, Iqc corresponding to the final torque command value Tcf by using a torque current conversion map in which the relationship between the final torque command value Tcf and the d-axis current command value Idc and the relationship between the final torque command value Tcf and the q-axis current command value Iqc are preset.

A dq-axis rotation coordinate is a rotation coordinate of 2 axes, which is composed of a d-axis that is defined in the direction of an N pole (magnetic pole position) of the permanent magnets provided in the rotor and a q-axis that is defined in the direction advanced by 90° ($\pi/2$) in electrical angle from the d-axis, and rotates in synchronization with a rotation at an electrical angle θ of the rotor.

The current coordinate transformation block 44 detects three phase currents Iu, Iv, Iw, which flow from the inverter 10 to the respective phase windings Cu, Cv, Cw of the rotary electric machine 2 on the basis of output signals of the current sensors 11. The current coordinate transformation block 44 converts the three phase currents Iu, Iv, Iw that flow through the respective phase windings into a d-axis current Id and a q-axis current Iq, which are expressed in the dq-axis rotation coordinate system, by performing a three-phase/two-phase conversion and a rotation coordinate transformation on the basis of the magnetic pole position θ.

The current feedback control block 41 performs current feedback control which changes a d-axis voltage command value Vd and a q-axis voltage command value Vq, in which a command signal of a voltage to be applied to the rotary electric machine 2 is expressed in the dq-axis rotation coordinate system, by proportional-integral (PI) control or the like so that the dq-axis currents Id, Iq approach to the dq-axis current command values Idc, Iqc. After that, the voltage coordinate transformation block 42 converts the dq-axis voltage command values Vd, Vq into three phase AC voltage command values Vu, Vv, Vw which are AC voltage command values to the windings of each phase of three phases by performing a fixed coordinate transformation and a two-phase/three-phase conversion on the basis of the magnetic pole position θ.

The PWM signal generation block 43 compares each of the three phase AC voltage command values Vu, Vv, Vw with a carrier wave (triangular wave) which has a vibration width of a DC power source voltage and is vibrated at a carrier frequency, turns on a rectangular pulse wave when the AC voltage command values exceed the carrier wave, and turns off the rectangular pulse wave when the AC voltage command values fall below the carrier wave. The PWM signal generation block 43 outputs the rectangular pulse wave of each phase of three phases as an inverter control signal Su, Sv, Sw of each phase of three phases to the inverter 10 and turns on/off each switching element of the inverter 10.

Next, calculation of the final torque command value Tcf will be described.

As shown in FIG. 1, the basic torque command calculation section 30 calculates a basic torque command value Tcb that is a basic command value of torque in which the rotary electric machine 2 is made to output. In the present embodiment, the basic torque command calculation section 30 calculates a vehicle request torque required for driving the wheels 8 according to an accelerator opening degree, a vehicle's speed, and the amount of charge of the DC power source 4, and the like. Then, the basic torque command calculation section 30 sets the basic torque command value Tcb on the basis of the vehicle request torque.

The vibration command calculation section 31 calculates a vibration torque command value Tcv that is a torque command value, the vibration torque command value Tcv being vibrated at a vibration frequency. In the present embodiment, the vibration command calculation section 31 includes: a basic vibration torque calculation block 34; and an amplitude addition presence/absence determination block 38. The basic vibration torque calculation block 34 calculates a basic vibration torque command value Tcvb that is a basic value of the vibration torque command value. The amplitude addition presence/absence determination block 38 performs amplitude addition presence/absence determination (to be described later) with respect to the basic vibration torque command value Tcvb and calculates the final vibration torque command value Tcv.

The basic vibration torque calculation block 34 is configured so as to set the vibration frequency to a frequency corresponding to a rotational frequency (electrical angle frequency) of the rotary electric machine 2. The basic vibration torque command value Tcvb is a torque command value that is for cancelling a torque vibration component such as a torque ripple and cogging torque, generated in an output torque of the rotary electric machine 2 and is set to a torque in an opposite phase to the torque vibration component. The torque ripple is generated by interaction between magnetic flux by the currents and magnetic flux by the magnets and becomes a frequency of 6n times (where, n is a natural number of equal to or higher than 1) as much as a basic frequency (electrical angle frequency) of the current. The cogging torque is generated by a difference between static magnetic suction forces of the stator and the rotor due to a rotor position and becomes a frequency of {(the least common multiple of the number of slots of the stator and the number of magnetic poles of the rotor)×(electrical angle frequency)}.

In the present embodiment, as the basic vibration torque command value Tcvb, the basic vibration torque calculation block 34 calculates a sine wave (or cosine wave) of a basic amplitude Ab, the sine wave (or cosine wave) being vibrated at a vibration frequency of an order m (where, m is a natural number of equal to or higher than 1) as much as the electrical angle frequency and having a difference of a phase γ with respect to m times as much as the electrical angle θ, as shown in Equation (1).

$$Tcvb = Ab \times \sin(m \times \theta + \gamma) \quad (1)$$

Figure 5:
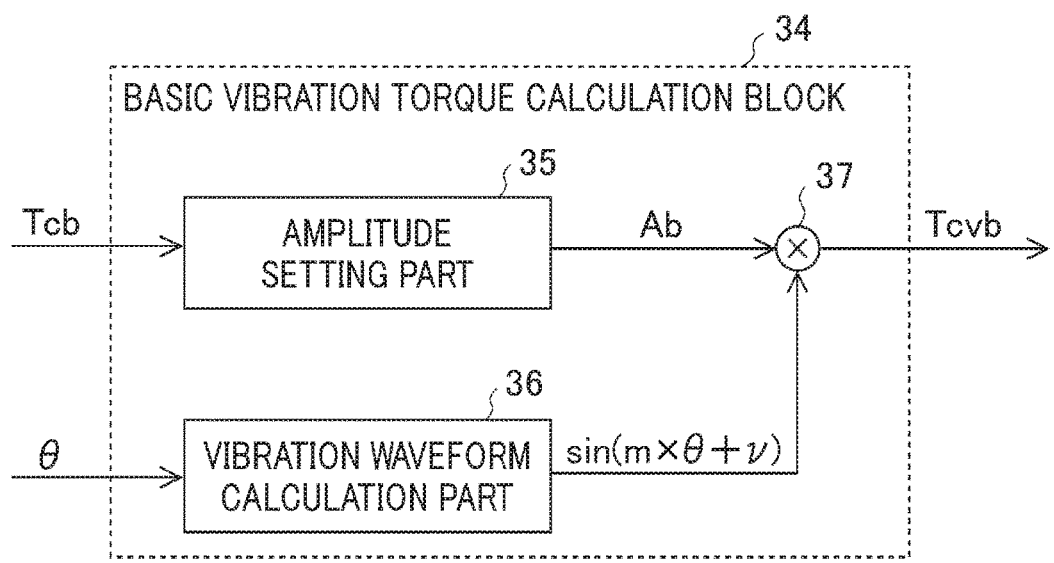
FIG. 5 is a block diagram showing a basic vibration torque calculation block in the control apparatus of the rotary electric machine according to Embodiment 1 of the present invention.

As shown in a block diagram of FIG. 5, the basic vibration torque calculation block 34 includes: an amplitude setting part 35; a vibration waveform calculation part 36; and a multiplier 37. The amplitude setting part 35 sets the basic amplitude Ab on the basis of the basic torque command value Tcb. In this example, the amplitude setting part 35 calculates the basic amplitude Ab corresponding to the basic torque command value Tcb calculated by the basic torque command calculation section 30 by using an amplitude table shown in FIG. 6, in which the relationship between the basic torque command value Tcb and the basic amplitude Ab is preset.

The vibration waveform calculation part 36 calculates a vibration waveform on the basis of the electrical angle θ detected by the rotational speed detection block 45, the preset order m, and the preset phase γ. In this example, the vibration waveform calculation part 36 calculates sin (m×θ+γ) as the vibration waveform. The vibration waveform calculation part 36 may change the phase γ according to operating conditions such a s the basic torque command value Tcb and the electrical angular velocity. Then, the multiplier 37 multiplies the basic amplitude Ab set by the amplitude setting part 35 and the vibration waveform sin (m×θ+γ) calculated by the vibration waveform calculation part 36 together to calculate the basic vibration torque command value Tcvb.

Figure 6:
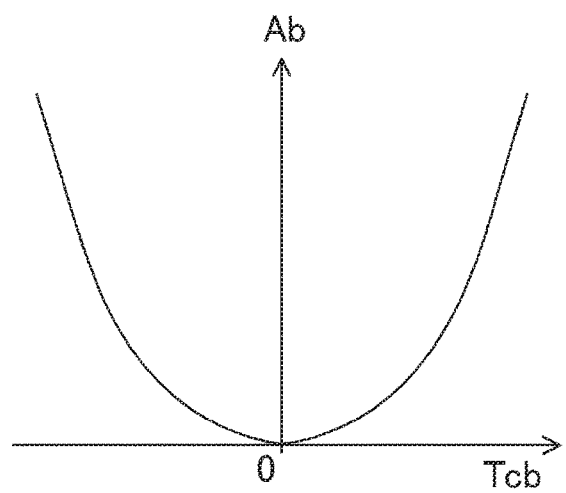
FIG. 6 is a view for explaining an amplitude table in the control apparatus of the rotary electric machine according to Embodiment 1 of the present invention.

An example of a setting method of the amplitude table and the phase γ will be described. The output torque of the rotary electric machine 2 when the vibration torque command value Tcv that is for cancelling the torque vibration is not superimposed on the basic torque command value Tcb is measured by a torque sensor under a plurality of operating conditions such as a different basic torque command value Tcb. Then, a measured output toque waveform is approximated to a sine wave by a method of least squares or the like. An amplitude of the approximated sine wave is set to the basic amplitude Ab and an opposite phase to a phase of the approximated sine wave is set to the phase γ. As shown in FIG. 6, the relationship between the basic torque command value Tcb and the basic amplitude Ab is preset as the amplitude table.

With an increase in absolute value of the basic torque command value Tcb, the amplitude of the torque vibration such as the torque ripple is also increased. Therefore, the amplitude table is set so as to increase the basic amplitude Ab with the increase in absolute value of the basic torque command value Tcb. Thus, the torque vibration whose amplitude is increased with the increase of the basic torque command value Tcb can be cancelled by the vibration torque command value. However, when the basic torque command value Tcb increases to the vicinity of an upper limit command value Tcmx (to be described later), the upper limit of the vibration torque command value whose amplitude is increased is limited by the upper limit command value Tcmx and there will arise a problem (to be described later).

Incidentally, in order to deal with a case where an order of the electrical angle frequency of the torque ripple is different from that of the cogging torque, it may be configured such that the vibration command calculation section 31 calculates a plurality of basic vibration torque command values Tcvb that are different in the order m and calculates a total value of the plurality of basic vibration torque command values Tcvb as the final basic vibration torque command value Tcvb.

The amplitude addition presence/absence determination block performs addition presence/absence determination of the vibration torque command value Tcv on the basis of the basic torque command value Tcb.

As shown in FIG. 1, the final torque command calculation section 32 calculates an addition torque command value Tcsm in which the vibration torque command value Tcv calculated by the vibration command calculation section 31 is added to the basic torque command value Tcb calculated by the basic torque command calculation section 30. Then, the final torque command calculation section 32 calculates a value in which the upper limit of the addition torque command value Tcsm is limited by the upper limit command value Tcmx that is preset correspondingly to a maximum output torque of the rotary electric machine 2, as the final torque command value Tcf to be finally commanded to the rotary electric machine 2.

Here, the maximum output torque of the rotary electric machine 2 is a maximum value of an average value of the output torque in which the rotary electric machine 2 is made to be able to output by the control apparatus 1, and becomes an output torque in which the torque vibration component, such as the torque ripple and the cogging torque is averaged. More specifically, the maximum output torque is a maximum average output torque. In the present embodiment, the upper limit command value Tcmx is set so as to correspond to the maximum output torque of the rotary electric machine 2. The maximum output torque of the rotary electric machine 2 changes according to the electrical angular velocity of the rotor, a power source voltage and the amount of charge of the DC power source 4, and the like. The final torque command calculation section 32 is configured so as to set the upper limit command value Tcmx on the basis of the electrical angular velocity of the rotor, the power source voltage and the amount of charge of the DC power source 4.

As shown in Equation (2), when the addition torque command value Tcsm in which the vibration torque command value Tcv is added to the basic torque command value Tcb is larger than the upper limit command value Tcmx, the final torque command calculation section 32 sets the upper limit command value Tcmx to the final torque command value Tcf. On the other hand, when the addition torque command value Tcsm is equal to or lower than the upper limit command value Tcmx, the final torque command calculation section 32 sets the addition torque command value Tcsm to the final torque command value Tcf.

$$\{1) \text{ In the case of } Tcsm(=Tcb+Tcv) > Tcmx,$$

$$Tcf = Tcmx$$

$$2) \text{ In the case of } Tcsm(=Tcb+Tcv) \leq Tcmx,$$

$$Tcf = Tcsm = Tcb + Tcv\} \quad (2)$$

Here, there will be described a comparative example that is configured so as not to perform amplitude addition determination processing by the amplitude addition presence/absence determination block 38 (to be described later), different from the present embodiment. As shown in a time chart of FIG. 7, if an addition torque command value Tcsm, in which a vibration torque command value Tcv (basic vibration torque command value Tcvb) to which amplitude reduction processing is not performed is added to the basic torque command value Tcb, is calculated in a state where a basic torque command value Tcb rises to the vicinity of an upper limit command value Tcmx, the upper limit of the addition torque command value Tcsm is limited by the upper limit command value Tcmx and becomes a state where a ridge portion of the vibration torque command value Tcv which is vibrating is cut away. Accordingly, an average value Tcfave of a final torque command value Tcf after limiting the upper limit becomes lower than the basic torque command value Tcb.

Figure 8:
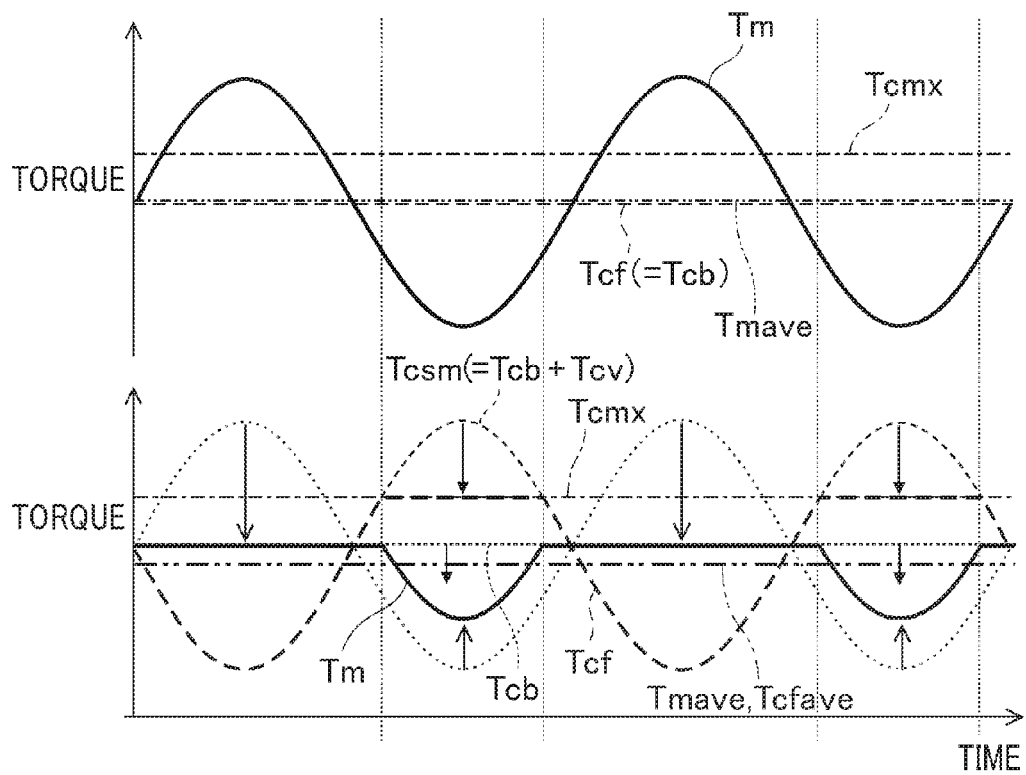
FIG. 8 is a time chart for explaining characteristics in an embodiment of the present invention.

Furthermore, a time chart of FIG. 8 shows a behavior of an output torque Tm of the rotary electric machine 2 according to a comparative example. The time chart in an upper stage of FIG. 8 is the behavior of the output torque Tm of the rotary electric machine 2 in the case that a vibration torque command value Tcv is not added to a basic torque command value Tcb different from the present embodiment, but the basic torque command value Tcb is set to the final torque command value Tcf as it is. The output torque Tm of the rotary electric machine 2 becomes a waveform in which a torque vibration component such as a torque ripple is superimposed on the basic torque command value Tcb. Furthermore, an average value Tmave of the output torque Tm of the rotary electric machine 2 falls below an upper limit command value Tcmx (maximum output torque); however, a ridge portion of the torque vibration component of the output torque Tm exceeds the upper limit command value Tcmx.

Figure 7:
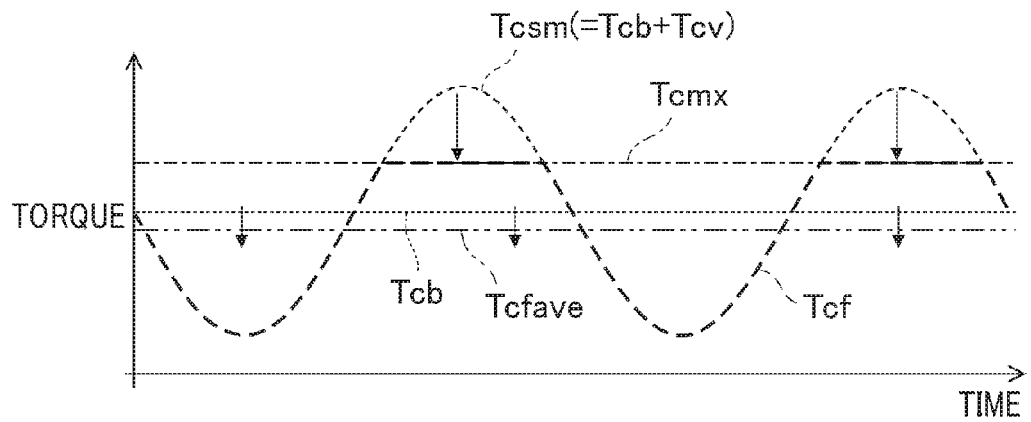
FIG. 7 is a time chart for explaining characteristics in an embodiment of the present invention.

The time chart in a lower stage of FIG. 8 is a behavior of the output torque Tm of the rotary electric machine 2, which corresponds to the comparative example of FIG. 7. A ridge portion of the torque vibration component of the output torque Tm is cancelled by a valley portion of the vibration torque command value Tcv whose upper limit is not limited and is reduced to the basic torque command value Tcb. On the other hand, since the upper limit of a ridge portion of the vibration torque command value Tcv is limited, a valley portion of the torque vibration component of the output torque Tm is not sufficiently cancelled and becomes lower than the basic torque command value Tcb. Thus, an average value Tmave of the output torque Tm of the rotary electric machine 2 also becomes lower than the basic torque command value Tcb. Accordingly, the comparative example has a problem that the output torque Tm lowers when the output torque Tm of the rotary electric machine 2 is made to increase to the vicinity of the upper limit command value Tcmx and a vehicle is made to accelerate.

So, in the present embodiment, the vibration command calculation section 31 is configured such that when a vibration maximum value in which an amplitude of the vibration torque command value Tcv is added to the basic torque command value Tcb becomes larger than the upper limit command value Tcmx, the addition of the vibration torque command value Tcv is stopped so that the vibration maximum value becomes equal to or lower than the upper limit command value Tcmx by the function of an amplitude addition presence/absence determination block 38.

In the present embodiment, the amplitude addition presence/absence determination block 38 is configured such that when a determination vibration maximum value (Tcb+Ab) in which the basic amplitude Ab of the basic vibration torque command value Tcvb is added to the basic torque command value Tcb is larger than the upper limit command value Tcmx, the addition of the vibration torque command value Tcv is stopped. According to this configuration, a torque range in which the vibration torque command value Tcv is not added is necessarily minimized and a decrease in reduction effect of the torque vibration can be necessarily minimized.

When the amplitude of the vibration torque command value Tcv is A, and if a relationship of (Tcb+A>Tcmx) is established, the amplitude may be set to zero (A=0). Specifically, as shown in Equation (3), when the determination vibration maximum value (Tcb+Ab) in which the basic amplitude Ab of the basic vibration torque command value Tcvb is added to the basic torque command value Tcb is larger than the upper limit command value Tcmx, the amplitude addition presence/absence determination block 38 sets the vibration torque command value Tcv to zero (Tcv=0). On the other hand, when the determination vibration maximum value (Tcb+Ab) is equal to or lower than the upper limit command value Tcmx, the amplitude addition presence/absence determination block 38 sets the basic vibration torque command value Tcvb to the final vibration torque command value Tcv as it is.

1) In the case of Tcb+Ab>Tcmx,

Tcv=0

2) In the case of Tcb+Ab≤Tcmx,

Tcv=Tcvb} (3)

Incidentally, when a total value of a plurality of basic vibration torque command values Tcvb which are different in the order m is regarded as the final basic vibration torque command value Tcvb, the amplitude addition presence/absence determination block 38 sets the amplitude of the total value to the basic amplitude Ab and performs calculation of Equation (3).

By the way, when the basic torque command value Tcb is rapidly changed due to disturbance, such as a rapid change in operation state and noise, the amplitude of the vibration torque command value Tcv to be calculated according to the basic torque command value Tcb is also rapidly changed. For example, a current detection value detected by the current sensor 11 is rapidly changed by the influence of the noise and the basic torque command value Tcb is rapidly changed by the influence. If the amplitude of the vibration torque command value Tcv is rapidly changed, the output torque of the rotary electric machine 2 is also rapidly changed; and accordingly, torque fluctuation is transmitted to the wheels 8 and a sense of discomfort is given to a driver.

So, in the present embodiment, the vibration command calculation section 31 is configured so as to perform low pass filter processing with respect to a setting value of the amplitude of the vibration torque command value Tcv. According to this configuration, the rapid change in amplitude of the vibration torque command value Tcv is suppressed and the torque fluctuation can be suppressed from being transmitted to the wheels 8. When the vibration torque command value Tcv is calculated by using Equation (1), the vibration command calculation section 31 performs low pass filter processing with respect to a setting value of the basic amplitude Ab.

Embodiment 2

Next, a control apparatus 1 according to Embodiment 2 will be described. Description of constitutional elements similar to the above Embodiment 1 will be omitted. A basic configuration and processing of a rotary electric machine 2 and the control apparatus 1 according to the present embodiment are similar to those of Embodiment 1; however, an amplitude addition presence/absence determination value in the amplitude addition presence/absence determination block is corrected.

A deviation is generated between the final torque command value Tcf and an actual output torque of the rotary electric machine 2. For example, when the final torque command value Tcf is transformed into the dq-axis current command values Idc, Iqc by using the torque current conversion map, a transformation error is generated by a linear interpolation of an interpolation or extrapolation. Furthermore, there is an individual difference due to manufacturing variations in the rotary electric machine 2. If coil lengths are different, coil resistance is different; and accordingly, a current value is different and the output torque is different even an applied voltage is the same. For example, in a torque range of 0 to 300 Nm, the output torque of the rotary electric machine 2 may be deviated in a range of about +2 Nm to −2 Nm relative to the final torque command value Tcf.

Accordingly, a deviation is generated between the maximum output torque of the rotary electric machine 2 and the upper limit command value Tcmx. More particularly, when the upper limit command value Tcmx is deviated so as to exceed the maximum output torque of the rotary electric machine 2, and even when the upper limit of the ridge portion of the vibration torque command value Tcv included in the final torque command value Tcf is not limited by the upper limit command value Tcmx, actually, there arises a case where the upper limit is limited by the maximum output torque of the rotary electric machine 2 and the rotary electric machine 2 is not made to be able to output the torque of the ridge portion of the vibration torque command value Tcv. Accordingly, it becomes a state similar to the graph in the lower stage of FIG. 8 and a problem exists in that the average value Tmave of the output torque Tm of the rotary electric machine 2 is decreased.

So, the present embodiment is configured so as to subtract a deviation width ΔTsh of the deviation from a preset amplitude addition presence/absence determination threshold value. More specifically, the vibration command calculation section 31 is configured such that when a vibration maximum value in which the amplitude and the deviation width ΔTsh of the vibration torque command value Tcv are added to the basic torque command value Tcb becomes larger than the upper limit command value Tcmx, the amplitude addition presence/absence determination value is made to decrease so that the vibration maximum value becomes equal to or lower than the upper limit command value Tcmx.

According to this configuration, when the upper limit command value Tcmx is deviated so as to exceed the maximum output torque of the rotary electric machine 2, the upper limit of the ridge portion of the vibration torque command value Tcv is suppressed from being limited by the maximum output torque of the rotary electric machine 2 and the average value Tmave of the output torque Tm of the rotary electric machine 2 can be suppressed from being decreased.

Embodiment 3

Next, a control apparatus 1 according to Embodiment 3 will be described. Description of constitutional elements similar to the above Embodiment 1 will be omitted. A basic configuration and processing of a rotary electric machine 2 and the control apparatus 1 according to the present embodiment are similar to Embodiment 1; however, an amplitude addition presence/absence determination value in the amplitude addition presence/absence determination block 38 is corrected.

As described in Embodiment 1, the control apparatus 1 is configured such that the current feedback control is performed so that the current value detected by the current sensor 11 approaches to the current command value set on the basis of the final torque command value Tcf. Accordingly, if a detection deviation is generated in the current sensor 11, a deviation is generated between the final torque command value Tcf and an actual output torque of the rotary electric machine 2.

Generally, since the current sensor 11 is corrected at ordinary temperature, the detection deviation is likely to be increased if the current sensor 11 becomes a high temperature. For example, when the current sensor 11 is a shunt type sensor, a current value corresponding to the amount of voltage drop across both ends of a resistor is calculated. Accordingly, since resistance of the resistor is increased and the amount of voltage drop is increased if the resistor becomes the high temperature, the detection current value becomes larger than the actual current value. A temperature rise of the current sensor 11 is generated when a temperature near the current sensor 11 in the inside of the inverter 10 rises, or when a current that flows through the resistor is increased. For example, when an outside air temperature in midsummer or the like is high and during high speed running or the like, the temperature rise of the current sensor 11 is increased and the current detection deviation is increased.

If the current detection deviation is large, the deviation width between the final torque command value Tcf and the actual output torque of the rotary electric machine 2 is also increased and the problem described in the above Embodiment 2 is generated. More specifically, a problem arises that when the upper limit command value Tcmx is deviated so as to exceed the maximum output torque of the rotary electric machine 2, there is generated a case in which the rotary electric machine 2 is not made to be able to output the torque of the ridge portion of the vibration torque command value Tcv by the upper limit limitation of the maximum output torque and the average value Tmave of the output torque Tm of the rotary electric machine 2 is decreased.

So, in the present embodiment, when the temperature of the current sensor 11 which detects the current that flows through the rotary electric machine 2 is equal to or higher a preset determination temperature (for example, 80° C.), the vibration command calculation section 31 calculates a current torque deviation width ΔTshi, which is the deviation width between the final torque command value Tcf generated due to a current detection error of the current sensor 11 and the output torque of the rotary electric machine 2 and performs amplitude addition presence/absence determination by the value in which a deviation width Δtshi is added to the basic torque command value Tcb.

More specifically, the vibration command calculation section 31 is configured such that when the temperature of the current sensor 11 is equal to or higher than the preset determination temperature, the amplitude addition presence/absence determination value is made to be decreased so that the vibration maximum value becomes equal to or lower than the upper limit command value Tcmx when the vibration maximum value in which the vibration torque command value Tcv and the current torque deviation width ΔTshi are added to the basic torque command value Tcb becomes larger than the upper limit command value Tcmx.

According to this configuration, when the temperature of the current sensor 11 is equal to or higher than the determination temperature and when the current detection deviation becomes large, the amplitude addition presence/absence determination value is made to be decreased.

This suppresses the upper limit of the ridge portion of the vibration torque command value Tcv from being limited by the maximum output torque of the rotary electric machine 2 and can suppress the average value Tmave of the output torque Tm of the rotary electric machine 2 from being decreased. On the other hand, when the temperature of the current sensor 11 is less than the determination temperature and the current detection deviation is small, subtraction of the current torque deviation width ΔTshi is not performed, the addition area of the vibration torque command value Tcv is prevented from being decreased more than necessary, and a reduction effect of torque vibration can be improved.

When the current sensor 11 has a temperature detection function, the vibration command calculation section 31 detects the temperature of the current sensor 11 on the basis of an output signal of the temperature sensor 13 provided in the current sensor 11; or the vibration command calculation section 31 detects the temperature of the current sensor 11 on the basis of the output signal of the temperature sensor 13 provided near the current sensor 11.

The current torque deviation width ΔTshi may be a preset constant value or may be changed according to the temperature of the current sensor 11. In the latter case, the vibration command calculation section 31 calculates the current torque deviation width ΔTshi corresponding to the detected temperature of the current sensor 11 by using a deviation width setting table in which the relationship between the temperature of the current sensor 11 and the current torque deviation width ΔTshi is preset.

The amplitude addition presence/absence determination block 38 is configured such that when a determination vibration maximum value (Tcb+Ab+ΔTshi) in which the basic amplitude Ab of the basic vibration torque command value Tcvb is added to the basic torque command value Tcb is higher than the upper limit command value Tcmx, Tcv is set to 0 Nm.

Specifically, the current torque deviation width ΔTshi is subtracted from the amplitude addition presence/absence determination value and an amplitude addition presence/absence determination value (after correction) is calculated.

Other Embodiment

Other embodiments of the present invention will be described. Incidentally, the configuration of respective embodiments to be described hereinafter are not limited to those in which the respective embodiments are singly applied, but the respective embodiments can be applied by combining with the configuration of other embodiments.

In the above respective embodiments, the description has been made on the case where the vibration command calculation section 31 is configured so as to calculate the vibration torque command value Tcv (basic vibration torque command value Tcvb) of the sine wave (or cosine wave) waveform. However, the embodiments of the present invention are not limited to this example. More specifically, any waveform is permissible if the vibration command calculation section 31 is configured so as to calculate the vibration torque command value Tcv (basic vibration torque command value Tcvb) which is vibrated at the vibration frequency; for example, the waveform of the vibration torque command value Tcv (basic vibration torque command value Tcvb) may be shaped in a waveform close to a vibration component of the output torque of the rotary electric machine 2, which is measured by the torque sensor in an experiment. For example, the vibration command calculation section 31 calculates a unit command value whose amplitude is 1 by combining a plurality of sine waves (or cosine waves) which are different in phase, or calculates a unit command value corresponding to an electrical angle θ by using a table in which the relationship between an angle and the unit command value is preset. Then, the vibration command calculation section 31 may calculate the basic vibration torque command value Tcvb by multiplying the unit command value and the basic amplitude Ab together.

The description has been made on the case where those due to the torque current conversion map and manufacturing variations are taken into account as the deviation width between the final torque command value Tcf and the actual output torque of the rotary electric machine 2 in the above Embodiment 2, as an example; and in Embodiment 3, as an example, the description has been made on the case where those due to the current detection deviation are taken into account as the deviation width between the final torque command value Tcf and the actual output torque of the rotary electric machine 2. However, the embodiments of the present invention are not limited to these examples. Those due to various causes may be taken into account as the deviation width between the final torque command value Tcf and the actual output torque of the rotary electric machine 2: and both of those due to the torque current conversion map and the manufacturing deviation and those due to the current detection deviation may be taken into account.

In the above respective embodiments, as an examples, the description has been made on the case where the vibration command calculation section 31 calculates the vibration torque command value Tcv that is for cancelling the torque vibration component, such as the torque ripple and the cogging torque, the torque vibration component being outputted by the rotary electric machine 2. However, the embodiments of the present invention are not limited to this example.

The vibration command calculation section 31 may calculate the vibration torque command value Tcv that is vibrated at the vibration frequency. For example, the vibration command calculation section 31 may calculate a vibration torque command value Tcv that is for cancelling axial-torsional vibration generated in a power transmission path that couples the rotary electric machine 2 to the wheels 8, or may calculate the vibration torque command value Tcv that is for cancelling both of the torque vibration component, such as the torque ripple and the cogging torque, and the axial-torsional vibration.

In the above respective embodiments, the description has been made on the case where the rotary electric machine 2 is served as the driving force source of the electric car, as an example. However, the embodiments of the present invention are not limited to this example. More specifically, the rotary electric machine 2 may be served as a driving force source of a hybrid car equipped with an internal combustion engine, or may be served as a driving force source of a device other than a vehicle.

In the above respective embodiments, the description has been made on the case where the rotary electric machine 2 is the permanent magnet type synchronous rotary electric machine, as an example. However, the embodiments of the present invention are not limited to this example. More specifically, the rotary electric machine 2 may be various rotary electric machines such as an induction rotary electric machine.

The present invention can also be applied to a hybrid vehicle, and effects similar to Embodiment 1 can be obtained.

Incidentally, the present invention can freely combine the respective embodiments and appropriately modify and/or omit the respective embodiments, within the scope of the present invention.

What is claimed is:

1. A control apparatus of a rotary electric machine, comprising:
    a basic torque command calculation section which calculates a basic torque command value Tcb that is a basic command value of torque in which said rotary electric machine is made to output;
    a vibration command calculation section which calculates a vibration torque command value Tcv that is a torque command value, the vibration torque command value Icy being vibrated at a vibration frequency; and
    a final torque command calculation section which calculates an addition torque command value Tcsm in which the vibration torque command value Tcv is added to the basic torque command value Tcb, and calculates a value in which the upper limit of the addition torque command value Tcsm is limited by an upper limit command value Tcmx that is preset correspondingly to a maximum output torque of said rotary electric machine, as a final torque command value Tcf to be commanded to said rotary electric machine,
    wherein said vibration command calculation section has an amplitude addition presence/absence determination block in which when a vibration maximum value in which an amplitude of the vibration torque command value Tcv is added to the basic torque command value Tcb becomes larger than the upper limit command value Tcmx, the addition of the vibration torque command value Tcv is stopped so that the vibration maximum value does not exceed the upper limit command value Tcmx.

2. The control apparatus of the rotary electric machine according to claim 1,
    wherein said vibration command calculation section calculates a value, in which an amplitude of the vibration torque command value Tcv and a preset deviation width between the final torque command value Tcf and an output torque of said rotary electric machine are added to the basic torque command value Tcb, as the vibration maximum value.

3. The control apparatus of the rotary electric machine according to claim 2,
    wherein said vibration command calculation section regards a value, in which a value corresponding to the amount of deviation is subtracted from a preset amplitude addition presence/absence determination value with respect to the amount of deviation between the final torque command value Tcf and the output torque of said rotary electric machine, as an amplitude addition presence/absence determination value after correction.

4. The control apparatus of the rotary electric machine according to claim 1,
    wherein said vibration command calculation section regards a value, in which a value corresponding to the amount of deviation is subtracted from a preset amplitude addition presence/absence determination value with respect to the amount of deviation between the final torque command value Tcf and the output torque of said rotary electric machine, as an amplitude addition presence/absence determination value after correction.

5. The control apparatus of the rotary electric machine according to claim 1,
    wherein when temperature of a current sensor that detects a current flowing through said rotary electric machine is equal to or higher than a preset determination temperature, said vibration command calculation section calculates a current torque deviation width, which is a deviation width between the final torque command value Tcf generated due to a current detection error of said current sensor and the output torque of said rotary electric machine, and regards a value, in which a value corresponding to the deviation width is subtracted from a preset amplitude addition presence/absence determination value, as an amplitude addition presence/absence determination value after correction.

6. The control apparatus of the rotary electric machine according to claim 1,
    wherein said vibration command calculation section performs low pass filter processing with respect to a setting value of the amplitude of the vibration torque command value Tcv.

* * * * *